(No Model.)
T. S. LA FRANCE.
PUMP VALVE.
No. 526,975. Patented Oct. 2, 1894.
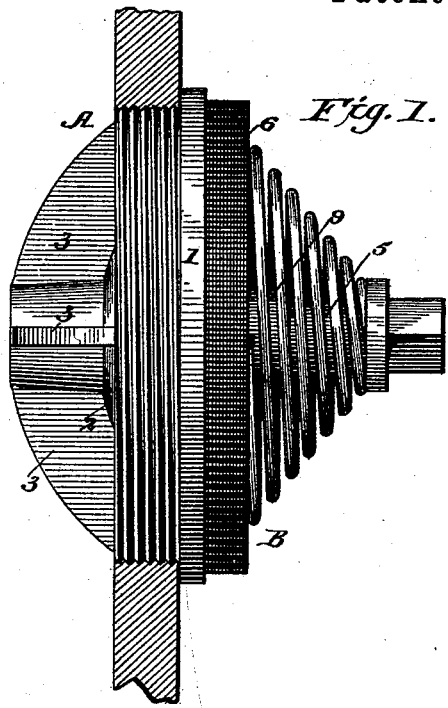
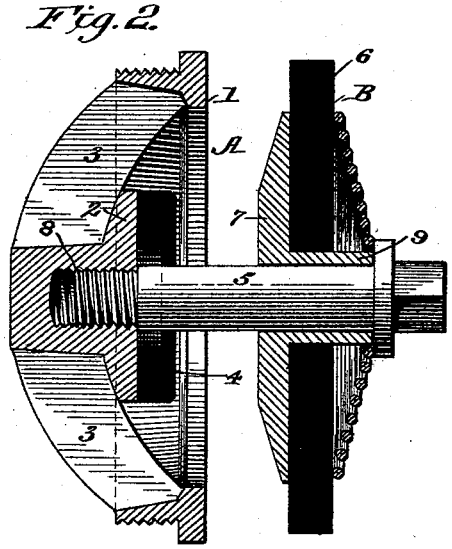
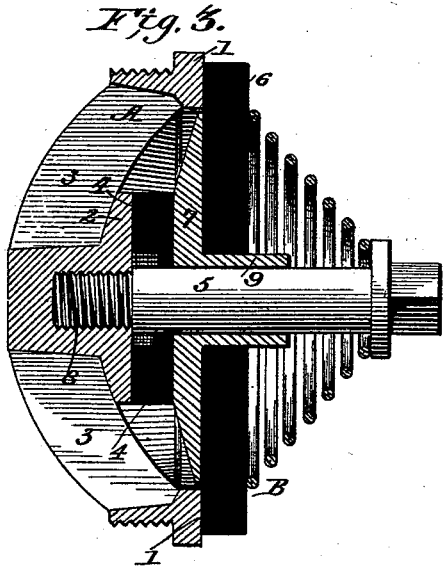
WITNESSES:
INVENTOR
Truckson S. La France
BY
ATTORNEYS.

UNITED STATES PATENT OFFICE.

TRUCKSON S. LA FRANCE, OF ELMIRA, NEW YORK.

PUMP-VALVE.

SPECIFICATION forming part of Letters Patent No. 526,975, dated October 2, 1894.

Application filed September 27, 1892. Serial No. 447,065. (No model.)

*To all whom it may concern:*

Be it known that I, TRUCKSON S. LA FRANCE, of Elmira, in the county of Chemung and State of New York, have invented a new and useful Improvement in Pump-Valves, of which the following is a specification.

My invention is an improvement in pump valves intended especially for steam fire engine pumps and the invention consists in the novel constructions and combinations of parts hereinafter described and pointed out in the claims.

In the drawings—Figure 1 is a side view of the valve. Fig. 2 is a section of the valve, the latter being in open position, and Fig. 3 is a similar view the valve being in closed position.

An important object of this invention is to provide simple constructions by which to prevent the valve packing from being forced into the throat of the port.

The valve seat A is formed with the outer ring or rim bearing 1 and the inner or central bearing 2 the latter being depressed below the bearing 1 and supported by the bridges 3 which connect it with the outer rim or ring. These bridges 3 are also depressed below the level of the rim bearing to prevent them from wearing the valve packing, and also to leave the throat of the valve unobstructed. Upon this central bearing I place a cushioning packing 4 having a central opening for the stem 5 on which the valve B slides. This cushion 4 is important as it eases the blow of the valve and prevents unusual wear on the rubber 4 and together with the construction by which such rubber 4 is prevented from being forced into the throat of the valve seat, tends to avoid injury to said rubber 4 and increase the length of service of same as will be readily understood. This valve B is formed with a packing 6 of rubber or the like and a bottom plate 7 usually of metal. This plate 7, in the closed position of the valve fits within the outer bearing of the seat and practically closes such opening. At its center the bottom plate 7 rests in the closed position of the valve, against the cushion 4. By preference the stem 5 is threaded into a socket 8 and the bottom plate 7 is provided centrally with a tubular portion 9 fitted on the stem 5 and within the central opening of the cushion 6.

The bottom plate 7— when the valve is seated, fills the throat of the upper valve seat and leaves so small a space between its edge and the bearing or seat 1 that it is impossible for the rubber packing to be forced by the pressure into the throat of the valve.

It will be seen that the bridges 3 extend below and connect centrally under the central bearing so that the latter is firmly and strongly supported across its entire diameter and a free and unobstructed water way is provided.

By means of the bottom plate of the valve the space is so contracted that it is impossible for the water pressure to force the rubber valve down through it, or, in other words while the valve is on its seat maintaining the water pressure there is no open water way or space left under the valve large enough for the rubber to be forced into it. It will also be seen that by the described construction and arrangement the holding up pressure is taken off the rubber packing or valve proper and is borne by the bottom plate 7 and the central bearing, the cushion on the latter softening the action of the valve and also preventing any leakage through the bottom plate. By thus relieving the packing or valve proper of the pressure I prevent the breaking down of the valve even if a thinner or weaker rubber than that usually employed should be used.

Having thus described my invention, what I claim as new, and desire to secure by Letters Patent, is—

1. The combination of the valve seat having an outer bearing, a central bearing, and a pad or cushion on the said central bearing, the valve proper fitted to said outer bearing, the supporting plate under said valve proper and arranged to abut against the cushion of the central bearing when the valve is closed, such supporting plate being formed to nearly fill the port or valve space when the valve is closed all substantially as and for the purposes set forth.

2. The improvement in valves herein described consisting of the seat having an outer bearing, an inner or central bearing provided with a pad or cushion the stem on which the valve slides, the valve proper, fitted to the outer bearing of the valve seat, the supporting plate under said valve proper made to nearly fill the port within the outer bearing and arranged to abut against the pad or cushion of the central bearing when the valve is closed all substantially as and for the purposes set forth.

TRUCKSON S. LA FRANCE.

Witnesses:
GEO. C. MILLER,
WM. B. DICKINSON.